United States Patent
Krause

(10) Patent No.: US 10,061,532 B2
(45) Date of Patent: Aug. 28, 2018

(54) MIGRATING DATA BETWEEN MEMORIES

(71) Applicant: HEWLETT PACKARD ENTERPRISE DEVELOPMENT LP, Houston, TX (US)

(72) Inventor: Michael R. Krause, Boulder Creek, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/114,969

(22) PCT Filed: Jan. 30, 2014

(86) PCT No.: PCT/US2014/013738
§ 371 (c)(1),
(2) Date: Jul. 28, 2016

(87) PCT Pub. No.: WO2015/116080
PCT Pub. Date: Aug. 6, 2015

(65) Prior Publication Data
US 2016/0342363 A1    Nov. 24, 2016

(51) Int. Cl.
*G06F 12/00*    (2006.01)
*G06F 3/06*    (2006.01)
(Continued)

(52) U.S. Cl.
CPC .......... *G06F 3/0647* (2013.01); *G06F 3/0613* (2013.01); *G06F 3/0683* (2013.01); *G06F 12/0804* (2013.01); *G06F 12/0891* (2013.01)

(58) Field of Classification Search
None
See application file for complete search history.

(56) References Cited

U.S. PATENT DOCUMENTS 6,745,294 B1    6/2004 Wilson et al.
6,874,065 B1    3/2005 Pong et al.
(Continued)

FOREIGN PATENT DOCUMENTS

CN    101218557    7/2008
CN    101324867    12/2008
(Continued)

OTHER PUBLICATIONS

"Scalable Shared-memory Multiprocessing and the Silicon Graphics S2MP Architecture"; http://people.engr.ncsu.edu/efg/506/s02/lectures/notes/lec22.html, Apr. 8, 1998; 17 pages.
(Continued)

*Primary Examiner* — Midys Rojas
(74) *Attorney, Agent, or Firm* — Trop, Pruner & Hu, P.C.

(57) ABSTRACT

A system includes multiple memories. Access of at least one of the multiple memories uses an interface subsystem that includes a memory controller and a distinct media controller, the memory controller to issue a transaction-level access request. The media controller is associated with at least one memory and produces, in response to the transaction-level access request, at least one command according to a specification of the at least one memory. Data is migrated from a first of the multiple memories to a second of the multiple memories, without the data traversing through a cache memory in the processor during the migrating.

16 Claims, 7 Drawing Sheets

(51) Int. Cl.
*G06F 12/0804* (2016.01)
*G06F 12/0891* (2016.01)

(56) References Cited

U.S. PATENT DOCUMENTS

| | | | |
|---|---|---|---|
| 7,472,234 | B2 | 12/2008 | Landry |
| 8,015,372 | B2 | 9/2011 | Hosomi |
| 8,626,996 | B2 | 1/2014 | Oh |
| 2004/0133756 | A1 | 7/2004 | Shaw et al. |
| 2006/0026373 | A1 | 2/2006 | Kaneda et al. |
| 2007/0011420 | A1 | 1/2007 | Boss |
| 2008/0172539 | A1 | 7/2008 | Boss et al. |
| 2010/0312955 | A1* | 12/2010 | Hwang ............ G06F 12/121 711/105 |
| 2011/0066767 | A1 | 3/2011 | Hyde |
| 2013/0007345 | A1 | 1/2013 | Barbou-Des-Places et al. |
| 2013/0046920 | A1 | 2/2013 | Ryu et al. |
| 2013/0227218 | A1 | 8/2013 | Chang et al. |
| 2013/0268739 | A1* | 10/2013 | Gupta ................. G06F 3/065 711/162 |
| 2017/0192886 | A1* | 7/2017 | Boehm ............. G06F 12/0804 |

FOREIGN PATENT DOCUMENTS

| | | |
|---|---|---|
| CN | 101369451 | 2/2009 |
| CN | 102498466 | 6/2012 |

OTHER PUBLICATIONS

International Searching Authority, The International Search Report and the Written Opinion, Oct. 27, 2014, 12 Pages.

Moraru, I. et al.; "Persistent, Protected and Cached: Building Blocks for Main Memory Data Stores"; Nov. 2012; 28 pages.

\* cited by examiner

MIGRATING DATA BETWEEN MEMORIES

BACKGROUND

A system can include a memory that s able to store data. A processor in the system can cause data to be read from or written to the memory. A system can include multiple memories. In some examples, the multiple memories may be memories of different types. In further examples, the multiple memories may be located at different memory tiers.

BRIEF DESCRIPTION OF THE DRAWINGS

Some implementations are described with respect to the following figures.

DETAILED DESCRIPTION

Figure 1:
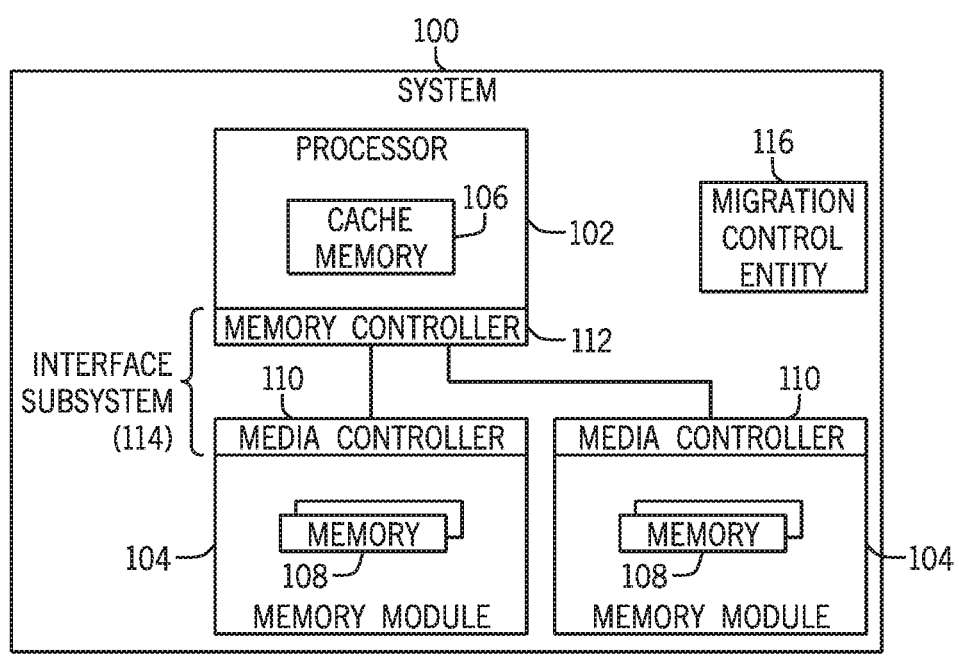
FIG. 1 is a block diagram of an example system according to some implementations.

In a system (computer system, communication system, storage system, etc.) that includes multiple memories, the multiple memories can exhibit different characteristics, such as different latencies, different bandwidths, different endurances, and so forth. Latency can refer to an amount of time experienced by a processor in completing a memory operation with respect to a memory. Bandwidth can refer to a data rate of data communicated between a processor and a memory. Different latencies and/or bandwidths can be caused by different access speeds of memories and/or different input/output (I/O) widths of memories. For example, a static random access memory (SRAM) has a faster access speed than a dynamic random access memory (DRAM). An I/O width of a memory can refer to a number of I/O data pins of the memory. As an example, a first memory that has a larger number of I/O data pins can generally provide reduced latency and/or increased bandwidth as compared to a second memory that has a smaller number of I/O data pins, assuming the first and second memories have the same access speed.

Different types (or technologies) of memories can also have different endurance. Endurance can be expressed as the number of write cycles that a memory can be subjected to before the memory becomes unreliable. As examples, a flash memory has a lower endurance than a DRAM or SRAM.

In addition to the foregoing, different memories can also have other characteristics that may differ, such as reliability (a more reliable memory can have lower error rates), cost, storage capacity, and so forth.

There can be many different types of memories that can be included in a system, such as any or some combination of memories according to the following technologies: SRAM, DRAM, flash memory, phase change memory, spin torque memory, memristor memory, magnetic disk-based memory, optical disk-based memory, and so forth.

In addition to including different types of memories, a memory arrangement can also have memories arranged in different topologies with respect to a processor. For example, some memories may be farther away from the processor than other memories. Alternatively, a path (or paths) between a first group of memories and the processor can have a different number of hops (e.g. switches) than path(s) between a second group of memories and the processor. In some examples, a memory arrangement can also include multiple memory tiers. A first memory tier may be closest to a processor, while a second memory tier may be farther away from the processor. Generally, a memory located farther away (or at a greater number of hops away) from the processor has increased latency (it takes longer to access data from such memory) than a memory located closer to (or at a smaller number of hops away from) the processor. Also, in some cases, memories located at different memory tiers may be memories of different types. For example, a memory tier that is closer to the processor may include memories having higher access speeds and greater endurance, while another memory tier that is farther from the processor may include memories having slower access speeds and lower endurance. A memory arrangement including memories of various different characteristics can provide relatively large storage capacity, but may be associated with issues due to non-uniformity of characteristics of different memories in the memory arrangement. Examples of various issues are discussed above.

For example, system performance may suffer if data in a first memory that has a larger latency and a smaller bandwidth is accessed more frequently than a second memory with a smaller latency and a larger bandwidth. As another example, frequent writes occurring to a memory that has reduced endurance may cause such memory wear out sooner.

To address some of the foregoing issues, data migration can be performed in a memory arrangement that includes multiple memories. For example, frequently updated data may be migrated from a first memory that has lower endurance to a second memory having greater endurance. As another example, frequently accessed data can be migrated from a slower memory to a faster memory.

Data migration between memories can also be performed for other purposes. As an example, to service or replace a particular memory, data stored in the particular memory can be first migrated to another memory. As another example, a first type of memory may have characteristics that allow the first type of memory to provide better performance for a given workload than another type of memory; in such cases, migrating data to the first type of memory may enhance system performance.

In accordance with some implementations, to provide enhanced performance, data migration between memories can be accomplished without the migrated data traversing through a cache memory of a processor. If the migrated data has to traverse through the cache memory of the processor, that can lead to several issues. For example, passing migrated data through the cache memory of the processor can lead to increased power consumption at the processor. Additionally, data may have to be evicted from the cache memory to make space in the cache memory for the migrated data. Evicting data takes time, since such data may have to be written to slower memory. Moreover, evicted data is no longer available in the cache memory to satisfy subsequent access requests, in which case such subsequent access requests would have to be satisfied from slower memory.

In addition, data migration can also be performed without the migrated data traversing through any input/output (I/O) subsystem (e.g. an I/O subsystem that includes a direct memory access (DMA) controller), and without the migrated data traversing through any storage subsystem that includes secondary storage media (separate from the memory arrangement), where the secondary storage media can include disk-based storage media, as examples.

FIG. 1 is a block diagram of an example system 100 that includes a processor 102 and various memory modules 104. Each memory module 104 includes one or multiple memories 108. A "memory" can refer to a physical or logical arrangement of storage cells for storing data. Although two memory modules 104 are depicted in FIG. 1, it is noted that in other examples, just one memory module or more than two memory modules may be present in the system 100. Also, the system 100 may include more than one processor 102.

The processor 102 includes a cache memory 106 that can store data read from a memory device 104. Data stored in the cache memory 106 can be accessed more quickly than the corresponding data from a memory module 104. If the processor 102 is able to respond to a request by retrieving data from the cache memory 106, than the processor 102 would not have to retrieve the data from a slower memory module 104.

The processor 102 further is associated with a memory controller 112 that interacts with a distinct media controller 110 associated with each of the memory modules 104. The memory controller 112 can be part of the processor 102 or can be separate from the processor 102. Similarly, each media controller 110 can be part of or separate from the respective memory module 104.

The memory controller 112 together with the media controllers 110 form an interface subsystem 114. By using the interface subsystem 114, the memory controller 112 that is associated with the processor 102 does not have to be concerned with issuing commands that are according to specifications of the respective memories 108. For example, a memory 108 can be associated with a specification that governs the specific commands (which can be in the form of signals) and timings of such commands for performing accesses (read access or write access) of data in the memory 108. The memory controller 112 can issue a transaction-level request that is independent of the specification governing access of a specific memory 108. A transaction-level request is a request to read data, write data, or perform other memory operation, at the level of a transaction. A transaction can refer to a unit of operation that can be performed in response to a request. The transaction-level request does not include commands that are according to the specification of a memory that is to be accessed.

A transaction-level request from the memory controller 112 is received by a respective media controller 110, which is able to respond to the transaction-level request by producing command(s) that is (are) according to the specification governing access of a target memory 108. For example, the command can be a read command, a write command, or another type of command, which has a format and a timing that is according to the specification. In addition to producing command(s) responsive to a transaction-level request from the memory controller 112, the media controller 110 is also able to perform other tasks with respect to the memory 108. For example, if a memory 108 is implemented with a DRAM, then the media controller 110 is able to perform refresh operations with respect to the DRAM. A storage cell in a DRAM gradually loses its charge over time. To address this gradual loss of charge in a storage cell, a DRAM can be periodically refreshed, to restore the charge of storage cells to their respective levels.

In other examples, if a memory 108 is implemented with a flash memory, then the media controller 110 can include wear-leveling logic to even out the wear among the storage cells of the memory 108. In addition, the media controller 110 can perform other media-specific operations with respect to the memory 108, such as a data integrity operation (e.g. error detection and correction), a data availability operation (e.g. failover in case of memory error), and so forth. The media controller 110 can also perform power management (e.g. reduce power setting of the memory 108 when not in use), statistics gathering (to gather performance statistics of the memory during operation), and so forth.

The interface subsystem 114 separates (physically or logically) memory control into two parts: the memory controller 112 and the media controller(s) 110. Note that the memory controller 112 and the media controller(s) 110 can be physically in separate devices or can be part of the same device. By separating the memory control into two pairs, greater flexibility can be achieved in the system 100 that includes different types of memories. The memory controller 112 does not have to be concerned with the specific types of memories used, since transaction-level requests issued by the memory controller 112 would be the same regardless of the type of memory being targeted. By splitting the memory controller 112 from the media controllers 110, development of the memory controller 112 can be simplified.

The system 100 also includes a migration control entity 116 to control migration of data between memories 108. For example, the migration control entity 116 can be in the form of machine-executable instructions that are executed on the processor 102. As another example, the migration control entity 116 can be part of a memory management entity (not shown in FIG. 1 but discussed further below), which can be separate from the processor 102. The migration control entity 116 can initiate a data migration. Alternatively, the migration control entity 116 can receive a request from the processor 102 or another entity to initiate data migration.

The migration control entity 116 is able to perform migration of data from a first memory to a second memory, where the first and second memories can be part of different memory modules 104 or part of the same memory module 104. The migration of the data from the first memory to the second memory can be performed by the migration control entity 116 without the migrated data traversing through the cache memory 106 of the processor 102.

Although not shown in FIG. 1, one or multiple I/O subsystems can also be included in the system 100, where the one or multiple I/O subsystems may be able to access the memories 108, such as by use of a DMA controller. In addition, one or multiple storage subsystems including secondary storage media (separate from the memory modules 104) can be present in the system 100. Data may be transferred between the memories 108 and the storage subsystem. As noted above, however, migration of data as performed by the migration control entity 116 between memories can be accomplished without the migrated data traversing through any of the I/O subsystem(s) and storage subsystem(s).

Figure 2:
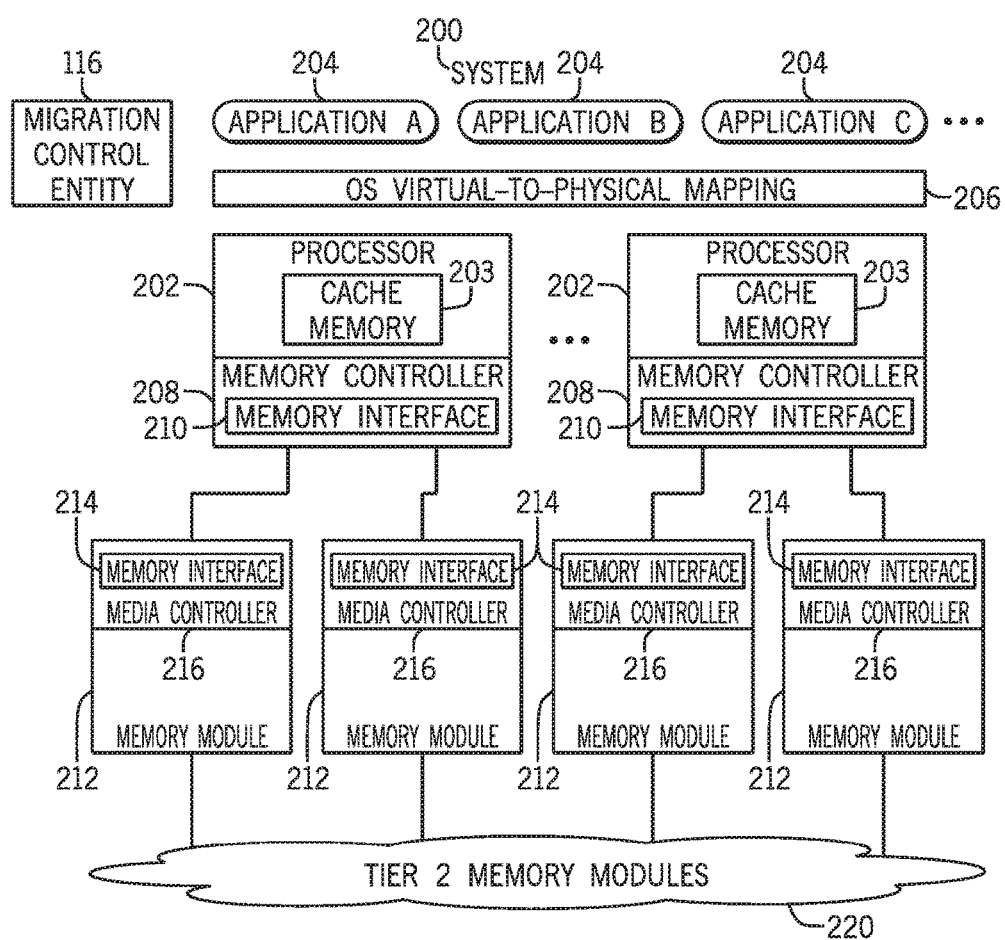
FIGS. 2-4 are block diagrams of different example systems including different memory topologies.

FIG. 2 is a block diagram of an example system 200 according to a first topology. The example system 200 includes processors 202, each including a respective cache memory 203. Applications 204 include machine-readable instructions that are executable on the processors 202. Also, a virtual-to-physical mapping 206 can be provided, where this mapping 206 can be part of an operating system (OS) of the system 200. The virtual-to-physical mapping translates a virtual address (which is used by an application 204) to a physical address that corresponds to an address of a memory.

Each processor 202 is associated with a respective memory controller 208 (similar to memory controller 112 of FIG. 1). The memory controller 208 includes a memory interface 210, which can include a physical layer that governs the communication of physical signals over a link between the memory controller 208 and a respective memory module (e.g. one of memory modules 212). The memory interface 210 can also include one or multiple other layers that control the communication of information over a link between the memory controller 208 and a respective memory module 212.

Each memory module 212 similarly includes a memory interface 214, which interacts with the memory interface 210 of the memory controller 208. The memory interface 214 is included in a respective media controller 216. The memory interface 214 can also include a physical layer, as well as one or multiple other layers.

In the example of FIG. 2, the memory modules 212 are part of one memory tier. In some implementations, the system 200 can include just a single memory tier of memory modules. In other implementations, the system 200 can include at least one more memory tier 220, which can include additional memory modules.

In some examples, a link between a memory interface 210 of a memory controller 208 and a memory interface 214 of a media controller 216 can be a serial link. In other examples, the link can be a different type of link. Also, although not shown, a link can include one or multiple switches to route transactions between a memory controller 208 and a media controller 216.

In the example of FIG. 2, two memory modules 212 are coupled to each respective processor 202. In other examples, other connection arrangements between the memory modules 212 and processors 202 can be provided.

The migration control entity 116 can perform migration of data between memories at the same memory tier, or between memories at different memory tiers.

Figure 3:
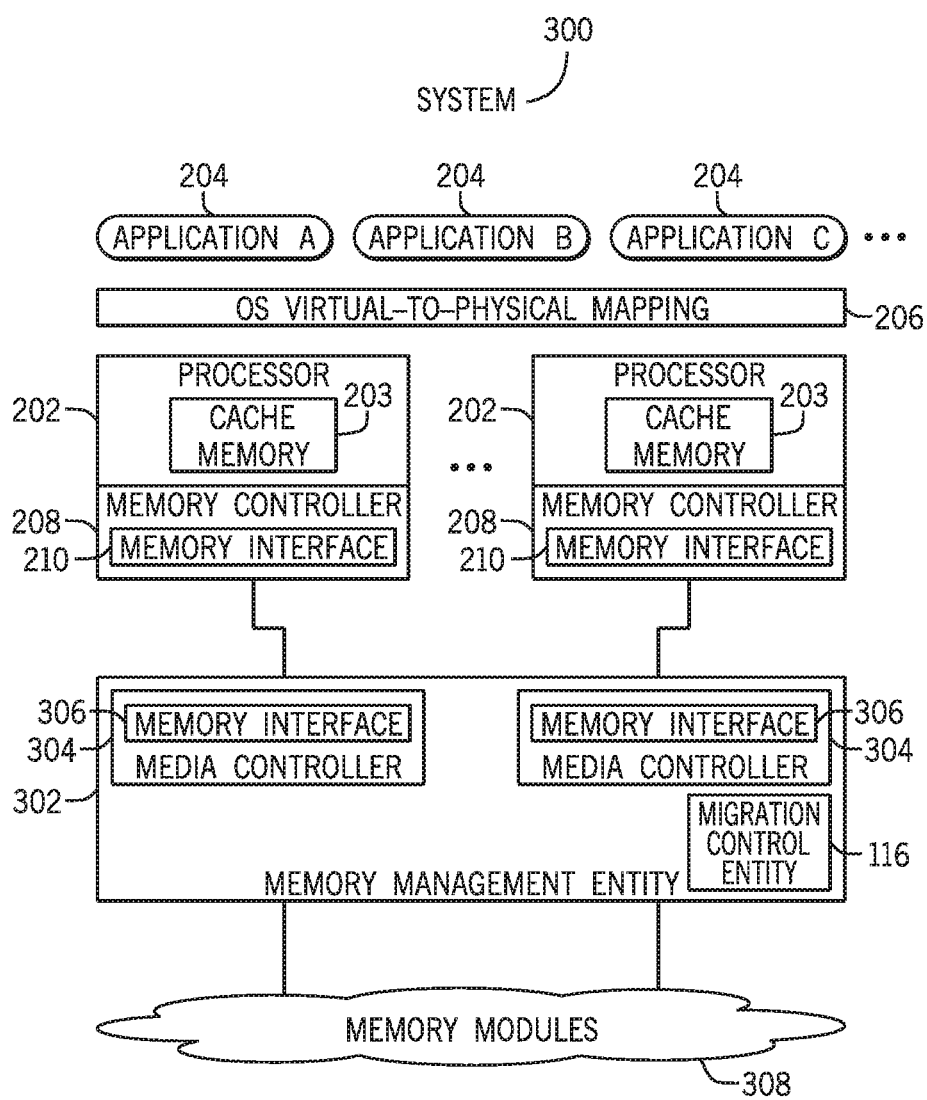

FIG. 3 is a block diagram of another example system 300, which similarly includes applications 204, the virtual-to-physical mapping 206, and processors 202 and memory controllers 208, as described in connection with FIG. 2.

However, in the system 300, a memory management entity 302 is provided between the memory controllers 208 and an arrangement of memory modules 308, which from the perspective of the processors 202 form a collection of memory that is accessible through the memory management entity 302. The memory modules 304 can be included in one memory tier or in multiple memory tiers.

The memory management entity 302 includes media controllers 304 having respective memory interfaces 306 for communicating with the memory controllers 208. In response to a transaction-level request from a memory controller, a media controller 304 in the memory management entity 302 can access one or multiple memory modules 308.

The memory management entity 302 also includes the migration control entity 116, which can perform migration of data between memory modules 304.

Figure 4:
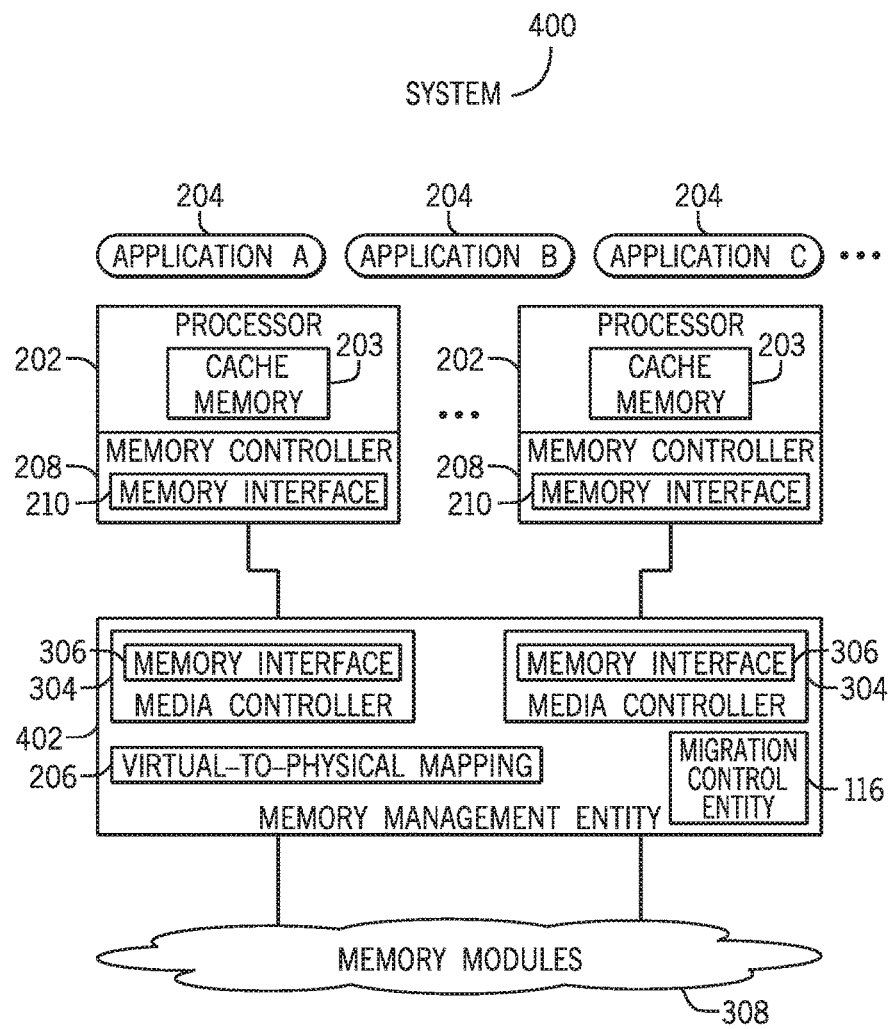

FIG. 4 is a block diagram of another example system 400, which differs from the system 300 in that the virtual-to-physical mapping 306 has been moved from the OS in FIG. 3 to the memory management entity 402 in FIG. 4. The memory management entity 402 includes similar functionality as the memory management entity 302, except that the memory management entity 402 further includes the virtual-to-physical mapping 206.

Figure 5:
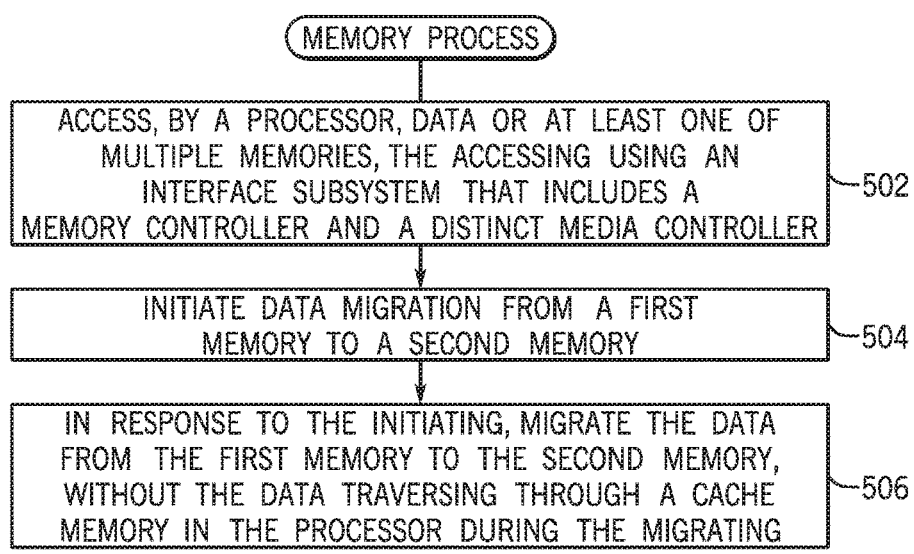
FIG. 5 is a flow diagram of a memory process according to some implementations.

FIG. 5 is a flow diagram of a process that can be performed by a system (e.g. any of systems 100-400) according to some implementations. A processor (e.g. 102 in FIG. 1 or 202 in FIGS. 2-4) accesses (at 502) data of at least one of multiple memories, where the accessing uses an interface subsystem (e.g. 114 in FIG. 1) that includes a memory controller 112 and a distinct media controller 110.

Migration of data from a first of the memories to a second of the memories is initiated (at 504). The initiating can be performed by machine-executable instructions executing on a processor, or by the migration control entity 116. In response to the initiating, the data is migrated (at 506) from the first memory to the second memory, without the data traversing through the cache memory (e.g. 106 in FIG. 1 or 203 in FIGS. 2-4) in the processor 102 during the migrating.

Several types of data migration may be performed in any of the example systems discussed above. A first type of data migration is a processor-visible data migration. A processor-visible memory migration refers to migration that is under control of machine-executable instructions that execute on a processor (e.g. 102 or 202). A second type of data migration is a processor-transparent data migration, in which migration is under control of an entity (e.g. memory management entity 302 or 402 in FIG. 3 or 4, respectively) separate from a processor. A processor-transparent data migration is transparent to a processor; in other words, no processor in the system is aware of the data migration.

Figure 6:
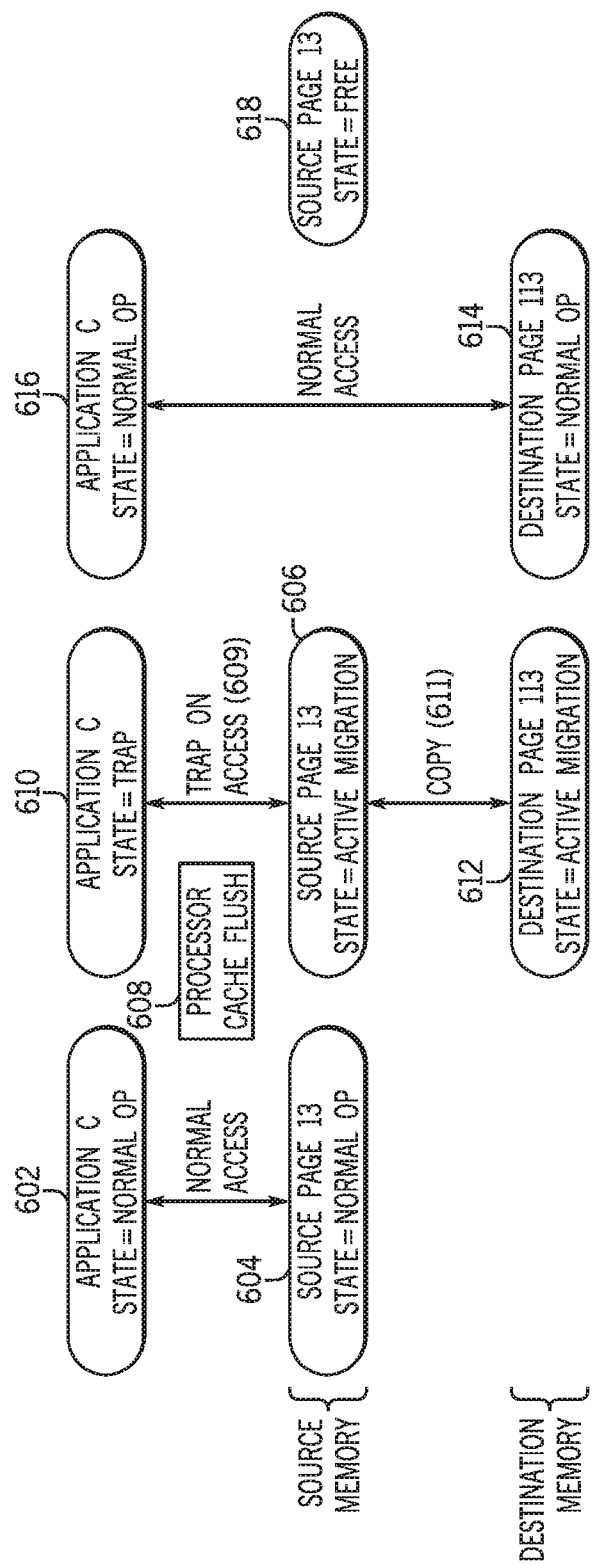
FIGS. 6-7 are schematic diagrams illustrating memory migration according to some implementations.

FIG. 6 is a schematic diagram of example memory operations that include a processor-visible memory data migration, according to some implementations. Processor-visible memory data migrations can be performed using the system 200 of FIG. 2, for example. In FIG. 6, it is assumed that application C is executing on a processor and is accessing data of a page in a source memory. A page can refer to a segment having a specified size in memory. In the example of FIG. 6, the page in the source memory that is accessed has a physical address 13. This page in the source memory can be referred to as source page 13.

Initially, application C is indicated as having a Normal Op state (oval 602). While application C is in the Normal Op state, application C can access page 13 normally (in other words, an access request of application C can be satisfied without incurring a delay due to migration of data). As indicated in oval 604, source page in the source memory is initially marked as having the Normal Op state (which means that this page is currently not being migrated).

At some later time, application C (or another entity) may decide to migrate source page 13 from the source memory to a destination memory. In response to initiation of migration of source page 13, source page 13 is marked as having an Active Migration State (oval 606), to indicate that source page 13 is being migrated or is about to be migrated. Also, a processor cache memory flush (oval 608) is performed, to flush any modified data of source page 13 in a cache memory (106 or 203) to the source memory, to ensure that the version of source page 13 that is migrated is the latest version. Any subsequent attempt by application C to write to source page 13 would result in a trap (609), which causes a delay in performing the page write request. In response to the trap (609), the state of application C is changed to a Trap state (oval 610). In the Trap state, application C can go to sleep to await completion of the migration of source page 13.

In alternative examples, rather than transitioning application C to a sleep state in response to the trap (609), a copy of the updated page due to the subsequent page write can be created, and this copy of the updated page can be used to update the migrated page in the destination memory after the migration is completed.

Note that in further examples, if source page 13 can be divided into multiple blocks such that the migration is performed on a block-by-block basis, then application C is allowed to normally access those blocks of source page 13 that are not actively being migrated. Only access by application C of the block that is actively being migrated would result in a trap (609).

Once the flush of the processor cache memory flush (oval 608) 106 has completed, a page copy operation (611) can be initiated to copy source page 13 to the destination memory. Note that the page copy operation (611) can be of the entire source page 13 on a page basis, or of blocks of the source page 13 on a block-by-block basis. In the example of FIG. 6, the migrated page in the destination memory has physical address 113 (referred to as destination page 113). In implementations where a page can be divided into multiple blocks, the migration can be performed on a block-by-block basis, such that the copying of the page from the source memory to the destination memory is an iterative copy operation, in which blocks are copied in sequence from the source memory to the destination memory. During the migration, blocks that are not actively being migrated can be updated, after which the migrated block can be copied to the destination memory.

While the page copy operation (611) is proceeding, destination page 113 has an Active Migration state. Once the migration is completed, destination page 113 is changed to the Normal Op state (oval 614), at which point application C can also be changed to the Normal Op state (oval 616). In this state, application C can perform a normal access of destination page 113 in the destination memory.

Once the page has been successfully migrated, the virtual-to-physical mapping 206 (FIG. 2) can be updated to reflect that the virtual address corresponding to the migrated page is now mapped to physical address 113 in the destination memory (rather than physical address 13 in the source memory). Also, source page 13 in the source memory is released, and the state of the source page 13 is changed to a Free state (oval 618) to indicate that source page 13 is available to be mapped to another virtual address.

In alternative implementations, a processor-transparent memory data migration can be performed, which may be possible using the topology of FIG. 3 or 4, in which the migration control entity 116 is in the memory management entity 302 or 402. Instead of machine-executable instructions driving the memory data migration, the memory management entity 302 or 402 drives the memory data migration.

In implementations where memory data migration is controlled by the memory management entity 302 or 402, flushing of the cache memory 106 of the processor 102 does not have to occur before the migration is performed. Moreover, migration can also be performed at a finer granularity (finer than at the page level).

The migration control entity 116 in the memory management entity 302 or 402 can perform memory data migration on a block-by-block basis, for example.

When the migration control entity 116 in the memory management entity 302 or 402 determines or is instructed to migrate a page of memory data, the memory management entity 302 or 402 can make a determination of the destination memory to which the page is to be migrated. The destination memory can be selected from multiple candidate memories, based on one or multiple criteria. The criteria can be based on the access speeds of the memories, the endurances of the memories, the tier levels of the memories, or other characteristics of the memories.

Figure 7:
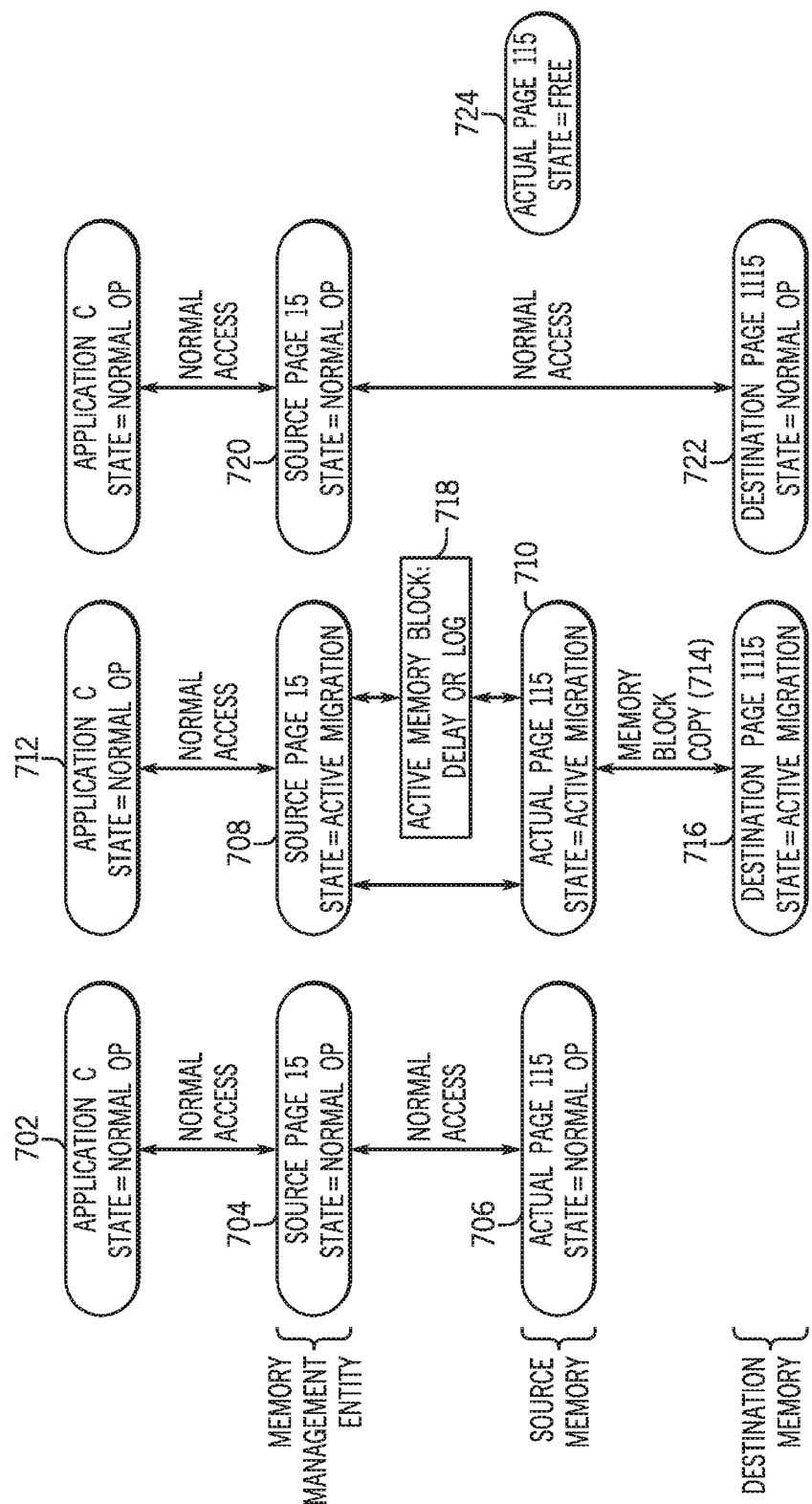

FIG. 7 shows example memory operations that include a processor-transparent migration of data, according to some implementations. The memory operations of FIG. 7 assume a system topology according to FIG. 3 or 4, in which a memory management entity 302 or 402 is disposed between a memory controller associated with a processor and memory modules.

Initially, application C has a Normal Op state (oval 702) that allows application C to access a page in the source memory in a normal manner. At the memory management entity (302 or 402), the source page accessed by application C has address 15 (referred to as source page 15). However, the actual physical address of the source page at the source memory is 115 (referred to as source page 115). Prior to migration, both source page 15 (at the memory management entity) and source page 115 (at the source memory) have the Normal Op state (ovals 704 and 706, respectively).

To migrate the source page from the source memory to the destination memory, both source page 13 and source page 113 can be marked as having an Active Migration state (ovals 708 and 710, respectively). However, since the migration is a processor-transparent migration controlled by the memory management entity, trapping does not have to occur for any request received from application C during migration of the source page. As a result, during migration of the source page, application C can remain in the Normal Op state (oval 712). Application C can continue to perform normal access of the source page during migration of the source page.

Note also that prior to migration in FIG. 7, the processor cache memory content corresponding to the migrated data does not have to be flushed. The memory management entity is aware of modified data of the migrated page in the processor cache, so flushing does not have to occur first prior to migration.

The migration of source page 115 from the source memory to the destination memory can be accomplished by a block copy operation (714) on a block-by-block basis. The migrated source page has physical address 1115 in the destination memory (referred to destination page 1115). During migration, destination page 1115 has the Active Migration state (oval 716).

During migration, if a write request targets a block of the source page that is not actively being copied from the source memory to the destination memory, then the write request can be handled normally. However, if the write request targets a block of the source page that is actively being copied, then the write request can be either delayed until the block copy completes, or the request may be logged for subsequent replay by the memory management entity once the block copy completes (oval 718). In examples where the write request targeting an actively copied block is delayed, application C may experience a slight delay in completing the write request.

As each block of the source page is migrated, the memory management entity can update its records to reflect the block's new physical location Once the page migration is completed, then application C can perform a normal access of destination page 1115 in the destination memory. After migration, application C still accesses source page 15 at the memory management entity. However, the actual page accessed is destination page 1115 in the destination memory. As depicted in FIG. 7, the state of each of source page 15 and destination page 1115 has been changed to the Normal Op state (ovals 720 and 722, respectively).

Once the page has been completely migrated, the memory management entity can release source page 115 in the source memory (whose state has been changed to the Free state, as depicted in oval 724).

Data migration between memories can be implemented using different types of operations. Such operations can include read requests and write requests for transferring data from the source memory to the destination memory. Alternatively, the operations can include buffer copy requests to copy data from one buffer to another buffer.

The migration control entity 116 discussed above can implemented in hardware or as a combination of hardware and machine-executable instructions. Instructions can be loaded for execution on a processor. A processor can include a microprocessor, microcontroller, processor module or subsystem, programmable integrated circuit, programmable gate array, or another control or computing device.

Instructions can be stored in one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
    accessing, by a processor in a system, data of at least one of a plurality of memories, the accessing using an interface subsystem that includes a memory controller and a distinct media controller, the memory controller associated with the processor and to issue a transaction-level access request, and the media controller associated with the at least one memory and to produce, in response to the transaction-level access request, at least one command according to a specification of the at least one memory;
    migrating, in the system, blocks of data on a block-by-block basis from a first of the plurality of memories to a second of the plurality of memories, without the data traversing through a cache memory in the processor during the migrating;
    in response to receiving a first request targeting an actively migrated block of the blocks, delaying processing of the first request until migration of the actively migrated block is completed; and
    in response to receiving a second request targeting a block, from among the blocks, that is not being actively migrated, processing the second request without delaying the second request.

2. The method of claim 1, wherein migrating the data from the first memory to the second memory comprises migrating the data from the first memory according to a first technology to the second memory according to a second, different technology.

3. The method of claim 1, wherein migrating the data from the first memory to the second memory comprises migrating the data from the first memory at a first memory tier to the second memory at a second, different memory tier.

4. The method of claim 1, wherein the migrating is controlled by machine-readable instructions executable by the processor.

5. The method of claim 1, wherein the migrating is controlled by a memory management entity that is separate from the processor, and the migrating is transparent to the processor.

6. The method of claim 1, further comprising:
    initiating migration of the data, wherein the migrating is in response to the initiating; and
    in response to the initiating, flushing a portion of content in the cache memory to the first memory, the flushing performed prior to the migrating.

7. The method of claim 1, wherein delaying the processing of the first request comprises logging the first request for subsequent replay.

8. A system comprising:
    a processor including a cache memory;
    a plurality of memories;
    an interface subsystem including a memory controller associated with the processor and a media controller associated with at least one of the plurality of memories, the memory controller to issue a transaction-level access request that is independent of a specification governing access of the at least one memory, and the media controller to produce, in response to the transaction-level access request, at least one command according to the specification; and
    a migration control entity to migrate a page of data on a block-by-block basis from a first of the plurality of memories to a second of the plurality of memories, without the page of data traversing through the cache memory of the processor
    wherein, the media controller is to, in response to receiving a first request targeting an actively migrated block of the blocks, delay processing of the first request until migration of the actively migrated block is completed, and
    the media controller is to, in response to receiving a second request targeting a block, from among the blocks, that is not being actively migrated, process the second request without delaying the second request.

9. The system of claim 8, wherein the migration control entity includes machine-readable instructions executable on the processor.

10. The system of claim 8, wherein the migration control entity is part of a memory management entity that is separate from the processor.

11. The system of claim 8, wherein the page of data is to be migrated from the first memory according to a first technology to the second memory according to a second, different technology.

12. The system of claim 8, wherein the page of data is to be migrated from the first memory at a first memory tier to the second memory at a second, different memory tier.

13. An article comprising at least one machine-readable storage medium storing instructions that upon execution cause a system to:

initiate data migration in a system including a plurality of memories, wherein access of data in at least one of the plurality of memories uses an interface subsystem that includes a memory controller and a distinct media controller, the memory controller associated with a processor and to issue a transaction-level access request, and the media controller associated with the at least one memory and to produce, in response to the transaction-level access request, at least one command according to a specification of the at least one memory;

migrate data from a first of the plurality of memories to a second of the plurality of memories, without the data traversing through a cache memory in the processor during the migrating and without the data traversing through any input/output subsystem in the system and any storage subsystem including secondary storage media in the system;

in response to receiving a first request targeting an actively migrated block of the blocks, delay processing of the first request until migration of the actively migrated block is completed; and in response to receiving a second request targeting a block, from among the blocks, that is not being actively migrated, process the second request without delaying the second request.

14. The article of claim 13, wherein the at least one machine-readable storage medium stores instructions that upon execution cause the system to, in response to initiating migration of the data, flushing a portion of content in the cache memory to the first memory, the flushing performed prior to the migrating.

15. The article of claim 13, wherein the at least one machine-readable storage medium stores instructions that upon execution cause the system to delay processing of the first request by logging the first request for subsequent replay.

16. The system of claim 8, wherein the media controller is to delay processing of the first request by logging the first request for subsequent replay.

\* \* \* \* \*